US012210530B2

(12) United States Patent
Sisson et al.

(10) Patent No.: US 12,210,530 B2
(45) Date of Patent: Jan. 28, 2025

(54) SYSTEM AND METHOD OF DYNAMICALLY GENERATING AND USING PEER GROUPS IN AN ELECTRONIC PROCUREMENT SYSTEM

(71) Applicant: Coupa Software Incorporated, San Mateo, CA (US)

(72) Inventors: Brent Sisson, Castro Valley, CA (US); Austin Haygood, Atlanta, GA (US); Alejandro Avalos Mar, Burnaby (CA); Emily Kelly, Chicago, IL (US); Liaowang Zou, Albany, CA (US); Parand Darugar, San Diego, CA (US)

(73) Assignee: Coupa Software Incorporated, San Mateo, CA (US)

( * ) Notice: Subject to any disclaimer, the term of this patent is extended or adjusted under 35 U.S.C. 154(b) by 0 days.

(21) Appl. No.: 18/325,194

(22) Filed: May 30, 2023

(65) Prior Publication Data
US 2024/0403300 A1   Dec. 5, 2024

(51) Int. Cl.
*G06F 16/2455* (2019.01)
*G06F 16/22* (2019.01)
*G06F 16/2457* (2019.01)
*G06F 16/248* (2019.01)

(52) U.S. Cl.
CPC .... *G06F 16/24564* (2019.01); *G06F 16/2282* (2019.01); *G06F 16/24578* (2019.01); *G06F 16/248* (2019.01)

(58) Field of Classification Search
None
See application file for complete search history.

(56) References Cited

U.S. PATENT DOCUMENTS

| 7,720,863 | B2 * | 5/2010 | Fifield | G06F 16/2448 |
| | | | | 726/4 |
| 7,853,643 | B1 * | 12/2010 | Martinez | H04L 69/22 |
| | | | | 709/224 |
| 11,971,908 | B2 * | 4/2024 | Neves | G06F 16/285 |

(Continued)

FOREIGN PATENT DOCUMENTS

CN   111666424 A   9/2020

OTHER PUBLICATIONS

The Structure of Adolescent Peer Networks.*

*Primary Examiner* — Kim T Nguyen
(74) *Attorney, Agent, or Firm* — Baker Botts L.L.P.

(57) ABSTRACT

In an embodiment, a method for dynamically generating and using peer groups in an e-procurement system includes creating an entity database with a plurality of attributes associated with entities and an ordered table of matching rules. Each matching rule having a priority value and two or more matching attributes. The method includes receiving a user input specifying a particular entity for generating a current peer group of other entities. The method includes accessing the entity database to retrieve particular attributes of the particular entity and querying the entity database to receive a result set of matching entities as the current peer group of other entities for the particular entity based on the particular attributes of the particular entity and the matching rules. The method further includes appending data for the matching entities in the result set to a peer group data structure associated with the particular entity.

20 Claims, 10 Drawing Sheets

(56) References Cited

U.S. PATENT DOCUMENTS

| | | |
|---|---|---|
| 2007/0220004 A1* | 9/2007 | Fifield ................. G06F 21/6227 |
| | | 707/999.009 |
| 2011/0196940 A1* | 8/2011 | Martinez .................. H04L 9/40 |
| | | 709/217 |
| 2012/0066072 A1 | 3/2012 | Kanigsberg |
| 2014/0156513 A1 | 6/2014 | Psota |
| 2020/0252205 A1 | 8/2020 | Padmanabhan |
| 2021/0019758 A1 | 1/2021 | Harris |
| 2021/0166196 A1* | 6/2021 | Lereya ............... G06Q 10/0633 |
| 2021/0166339 A1* | 6/2021 | Mann ............ G06Q 10/063114 |
| 2022/0180317 A1* | 6/2022 | Andrews .............. G06F 40/279 |
| 2022/0414692 A1* | 12/2022 | Shariff ................... G06F 16/00 |
| 2023/0409606 A1* | 12/2023 | Neves ................. G06F 16/2282 |

* cited by examiner

300A 

| Variables 302 | Hierarchical attribute values/ Attributes 304 | Total hierarchical levels 306 |
|---|---|---|
| Commodity | 2: Sub Category<br>1: Primary Category | 2 |
| Business Type | 3: Business type level 3<br>2: Business type level 2<br>1: Business type level 1<br>0: All business types | 4 |
| Region | 3: Billing Country<br>2: Super Region<br>1: Global | 3 |
| Company Size | 3: Same company size<br>2: +/- 1 company size<br>1: All company sizes | 3 |

*FIG. 3A*

| Hierarchy Ranking R1-R18 | Example Commodity Category | Coupa Business Type | Region | Company Size |
|---|---|---|---|---|
| 1 | Sub Commodity | Business Type 3 | Country | Same Revenue Class |
| 2 | Sub Commodity | Business Type 3 | Country | Adjacent Revenue Class |
| 3 | Sub Commodity | Business Type 3 | Country | All Companies |
| 4 | Sub Commodity | Business Type 3 | Super Region | Same Revenue Class |
| 5 | Sub Commodity | Business Type 3 | Super Region | Adjacent Revenue Class |
| 6 | Sub Commodity | Business Type 3 | Super Region | All Companies |
| 7 | Sub Commodity | Business Type 2 | Country | Same Revenue Class |
| 8 | Sub Commodity | Business Type 2 | Country | Adjacent Revenue Class |
| 9 | Sub Commodity | Business Type 2 | Country | All Companies |
| 10 | Sub Commodity | Business Type 2 | Super Region | Same Revenue Class |
| 11 | Sub Commodity | Business Type 2 | Super Region | Adjacent Revenue Class |
| 12 | Sub Commodity | Business Type 2 | Super Region | All Companies |
| 13 | Sub Commodity | Business Type 1 | Country | Same Revenue Class |
| 14 | Sub Commodity | Business Type 1 | Country | Adjacent Revenue Class |
| 15 | Sub Commodity | Business Type 1 | Country | All Companies |
| 16 | Sub Commodity | Business Type 1 | Super Region | Same Revenue Class |
| 17 | Sub Commodity | Business Type 1 | Super Region | Adjacent Revenue Class |
| 18 | Sub Commodity | Business Type 1 | Super Region | All Companies |

Entity Attributes 502

| Instance | Industry_v2 | Primary Category | Sub Category | Billing Category | Supra Segment | Business Type Level 1 | Business Type Level 2 | Business Type Level 3 | Company Size |
|---|---|---|---|---|---|---|---|---|---|
| BigBox | Retail & Hospitality | Marketing Services and Supplies | Photography, Film, and Video | United States | NA | Retail, Wholesale & Distribution | Retail, Stores & Services Centers | Clothing, Cosmetics & Apparel Stores | ENT |

Peer Group Example 504

| Instance | Industry_v2 | Primary Category | Sub Category | Billing Category | Supra Segment | Business Type Level 1 | Business Type Level 2 | Business Type Level 3 | Company Size |
|---|---|---|---|---|---|---|---|---|---|
| EyeStore | Retail & Hospitality | | | | | | | | MM |
| SoftClothes | Retail & Hospitality | | | | | | | | |
| WorkoutWear* | Consumer Good & Services | | | United States | NA | Retail, Wholesale & Distribution | Retail, Stores & Services Centers | Clothing, Cosmetics & Apparel Stores | ENT |
| Fifth Ave Jewels | Retail & Hospitality | | | | | | | | |
| Edu Charity* | Education, Public Sector and Non-Profit | Marketing Services and Supplies | Photography, Film, and Video | | | | | | |
| Discount Store | Retail & Hospitality | | | | | | | | |
| Office Store* | Business Services | | | | | | | | CORP |
| Fabric Store | Retail & Hospitality | | | | | | | Clothing, Cosmetics & Apparel Stores | ENT |
| Pro Fish Store | Retail & Hospitality | | | Canada | | | | | |
| Leggings Outlet* | Consumer Good & Services | | | | | | | Clothing, Cosmetics & Apparel Stores | ENT |

*FIG. 5A*

Peer Grouping Example: Coupa Attributes 506

| Instance | Business Type 1 | Business Type 2 | Business Type 3 | Country | Super Region | Size |
|---|---|---|---|---|---|---|
| coupa_purchasing | Technology | Information Technology | Software Application Development | United States | us | MM |

| Coupa Sub Category Pred Target | A Invoice Commodity Tar.. | % of Total Running Sum of A Invoice C.. | Logic Rank | Count of Peers |
|---|---|---|---|---|
| Web Hosting Services | 47,940,443 | 23.19% | 1 | 27 |
| General Insurance | 31,780,045 | 38.56% | 1 | 22 |
| Cloud Computing Platform and Appli.. | 26,500,953 | 51.38% | 1 | 41 |
| Rent and Lease Payments | 16,508,391 | 59.37% | 1 | 37 |
| Advertising | 9,940,685 | 64.18% | 1 | 48 |
| IT/Technology Consulting | 9,415,928 | 68.73% | 1 | 37 |
| Marketing Consulting | 6,881,680 | 72.06% | 1 | 13 |
| Software Maintenance and Support | 5,679,115 | 74.81% | 1 | 44 |
| Legal Advisory and Consulting | 4,394,413 | 76.93% | 1 | 43 |
| Life Insurance Services and Products | 3,262,370 | 78.51% | 1 | 26 |
| Online Advertising | 2,843,304 | 79.89% | 3 | 13 |
| Audit Services | 2,788,714 | 81.24% | 1 | 21 |
| Laptops, Notebooks, and Tablets | 2,614,450 | 82.50% | 1 | 48 |
| Management Consulting | 2,607,986 | 83.76% | 1 | 30 |
| Accounting | 2,166,811 | 84.81% | 1 | 27 |
| Tax Advisory | 2,006,673 | 85.78% | 1 | 10 |
| Recruiting | 1,901,233 | 86.70% | 1 | 49 |
| Event Management | 1,806,024 | 87.57% | 1 | 21 |
| Hotel Expenses | 1,762,353 | 88.43% | 1 | 18 |
| Sponsorship of Event and Celebrity | 1,515,727 | 89.16% | 1 | 22 |
| Strategic Consultancy | 1,407,547 | 89.84% | 18 | 10 |
| ... | ... | ... | ... | ... |
| Warehouse Associates | 862,760 | 94.35% | 19 | 23 |

FIG. 5B

| Hierarchy Ranking | Example Commodity Category | Coupa Business Type | Region | Company Size |
|---|---|---|---|---|
| 1 | Sub Commodity | Business Type 3 | Country | Same Revenue Class |
| 2 | Sub Commodity | Business Type 3 | Country | Adjacent Revenue Class |
| 3 | Sub Commodity | Business Type 3 | Country | All Companies |
| 4 | Sub Commodity | Business Type 3 | Super Region | Same Revenue Class |
| 5 | Sub Commodity | Business Type 3 | Super Region | Adjacent Revenue Class |
| 6 | Sub Commodity | Business Type 3 | Super Region | All Companies |
| 7 | Sub Commodity | Business Type 2 | Country | Same Revenue Class |
| 8 | Sub Commodity | Business Type 2 | Country | Adjacent Revenue Class |
| 9 | Sub Commodity | Business Type 2 | Country | All Companies |
| 10 | Sub Commodity | Business Type 2 | Super Region | Same Revenue Class |
| 11 | Sub Commodity | Business Type 2 | Super Region | Adjacent Revenue Class |
| 12 | Sub Commodity | Business Type 2 | Super Region | All Companies |
| 13 | Sub Commodity | Business Type 1 | Country | Same Revenue Class |
| 14 | Sub Commodity | Business Type 1 | Country | Adjacent Revenue Class |
| 15 | Sub Commodity | Business Type 1 | Country | All Companies |
| 16 | Sub Commodity | Business Type 1 | Super Region | Same Revenue Class |
| 17 | Sub Commodity | Business Type 1 | Super Region | Adjacent Revenue Class |
| 18 | Sub Commodity | Business Type 1 | Super Region | All Companies |
| 19 | Primary Commodity | Business Type 3 | Country | Same Revenue Class |
| 20 | Primary Commodity | Business Type 3 | Country | Adjacent Revenue Class |
| 21 | Primary Commodity | Business Type 3 | Country | All Companies |
| ... | ... | ... | ... | ... |
| 29 | Primary Commodity | Business Type 2 | Super Region | Adjacent Revenue Class |

FIG. 5B Continued

SYSTEM AND METHOD OF DYNAMICALLY GENERATING AND USING PEER GROUPS IN AN ELECTRONIC PROCUREMENT SYSTEM

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. ©2022-2023 Coupa Software Incorporated.

FIELD OF THE DISCLOSURE

One technical field of the present disclosure is computer-implemented methods of automatically generating recommendations of suppliers and peer entities in large-scale, distributed, multi-tenant electronic procurement systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Electronic procurement or e-procurement has developed as a discrete technical field or technology in which programmed computers are applied to solve telecommunication problems of how to connect distant user accounts associated with buyers and suppliers, negotiate terms of contracts for the supply of tangible or intangible goods or services, provide corresponding suggestions to buyers and suppliers, and track purchase orders, invoicing, and payment. E-procurement is often practiced using networks of distributed computers and software-as-a-service or SaaS-based online applications. E-procurement systems commonly use large-scale distributed databases to store records of buyer accounts, supplier accounts, transactions, and metadata; different enterprises can be associated with logically distinct instances of the system, while commonly using a multi-tenant distributed database in which records of enterprises are segregated using security controls.

Buyer companies or entities often procure goods and services provided by many supplier companies or entities through an e-procurement system. The e-procurement system allows buyer entities to procure items or services in bulk and/or through contracts with a plurality of supplier entities. Although individual buyer computers, buyer accounts, and buyer entities normally initiate and complete transactions independently of other buyers, in a federated multi-tenant system, the data of multiple different buyers represents a community of information that can be useful to all buyers or suppliers. De-identified data for transactions involving distinct entities, even business competitors, can be useful to suggest transactions, suppliers, or metadata for transactions. However, a key challenge is determining which data associated with a first entity is truly relevant to a second entity; if the entities act in unrelated fields or are different in size or geography, data for one could be irrelevant to the other. Yet peer entities may have data that is useful to other entities in a peer group. Thus, programmers and developers of e-procurement systems have accrued an acute need for more efficient technical means of forming groups of peers.

SUMMARY

The appended claims may serve as a summary of the disclosure.

BRIEF DESCRIPTION OF THE DRAWINGS

In the drawings:

FIG. 3A illustrates a diagram of an example priority rank file with a plurality of attributes associated with an entity.

FIG. 3B illustrates a diagram of an example ordered table of matching rules with hierarchy rankings.

FIG. 5A illustrates a plurality of example attributes associated with a particular entity and an example peer group of matching entities associated with the particular entity.

FIG. 5B illustrates a plurality of peer groups associated with particular attributes.

DETAILED DESCRIPTION

Figure 1:
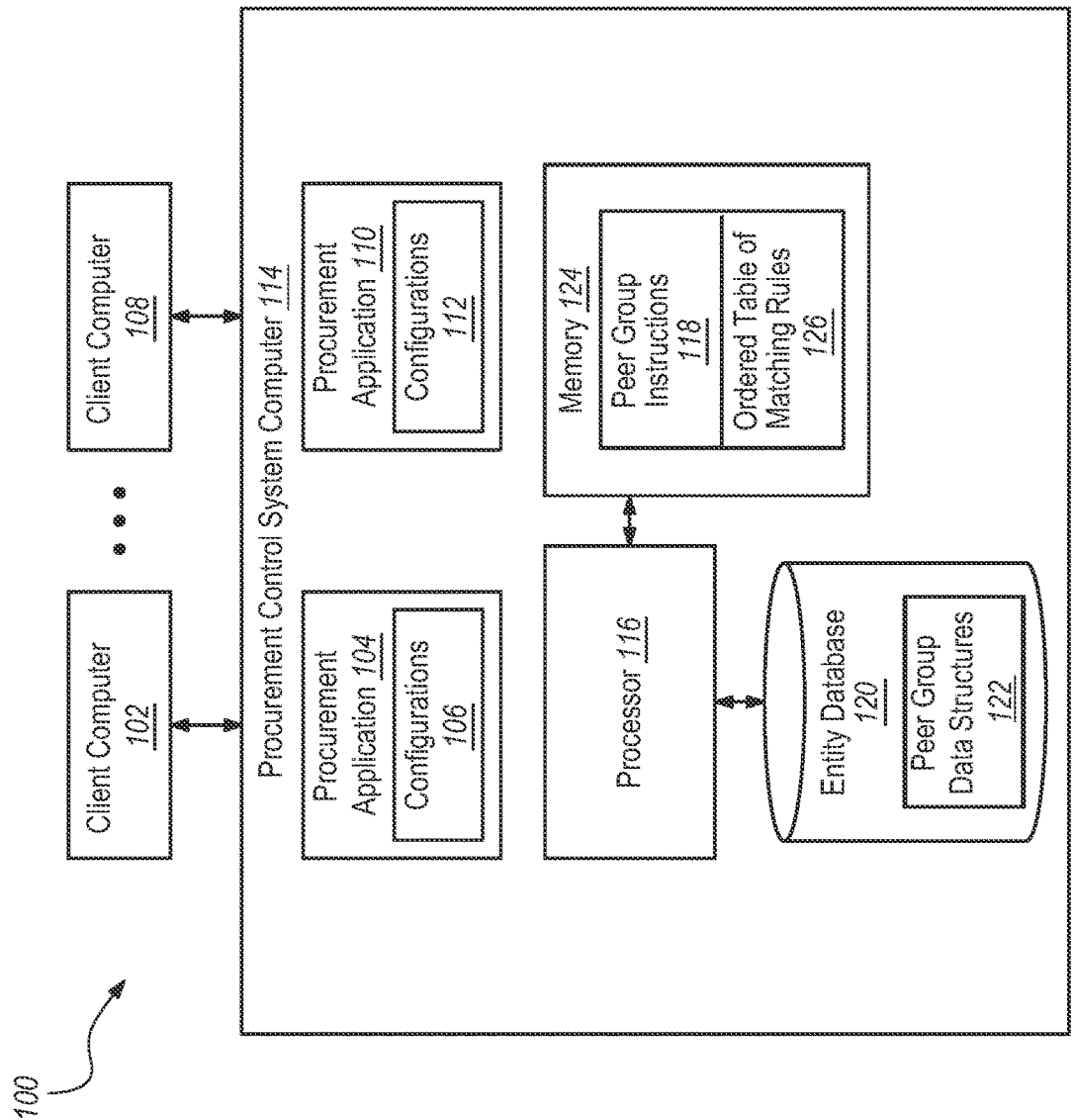
FIG. 1 is a block diagram of an example networked computer system in which various embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to describe the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended as limiting the disclosure in any way or as a basis for interpreting the claims. Devices that are described as in communication with each other need not be in continuous communication with each other unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the inventions. Similarly, although process steps, method steps, algorithms, or the like may be described in sequential order, such processes, methods, and algorithms may generally be configured to work in different orders, unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the inventions(s), and does not imply that the illustrated process is preferred. The steps may be described once per embodiment, but need not occur only once. Some steps may be omitted in some embodiments or some occurrences, or some steps may be executed more than once in a given embodiment or occurrence. When a single device or article is described, more than one device or article may be used in place of a single device or article. Where more than one device or article is described, a single device or article may be used in place of more than one device or article.

The functionality or features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

Embodiments are described in sections according to the following outline:
   1.0 GENERAL OVERVIEW
   2.0 STRUCTURAL AND FUNCTIONAL OVERVIEW
   3.0 PROCEDURAL OVERVIEW
      3.1 DYNAMICALLY GENERATING AND USING PEER GROUPS
      3.2 MATCHING RULES FOR GENERATING A PEER GROUP
   4.0 IMPLEMENTATION EXAMPLE
   5.0 HARDWARE OVERVIEW 1.0 General Overview In some embodiments, the disclosure provides systems and methods for dynamically generating and using peer groups in an electronic procurement system. In an embodiment, a computer-implemented method includes creating and storing an entity database having rows corresponding to entities, each row having a plurality of attributes per entity. The method includes creating and storing an ordered table of matching rules, with each matching rule having a priority value and two or more matching attributes. The method includes receiving a user input specifying a particular entity and a request to generate a current peer group of other entities; accessing the entity database to retrieve particular attributes of the particular entity based on the ordered table of the matching rules; reading the next successive matching rule in the ordered table of the matching rules; and querying the entity database to receive a result set of matching entities as the current peer group of other entities for the particular entity based on the particular attributes of the particular entity, and the matching rules. The matching entities in the result set may have attribute values of the attributes specified in the matching rules that exactly match the corresponding particular attributes of the particular entity. The computer-implemented method includes appending data for the matching entities in the result set to a peer group data structure associated with the particular entity; determining whether a peer group size of the peer group data structure associated with the particular entity is larger than a threshold size; and in response to determining that the peer group size of the peer group data structure is larger than the threshold size associated with the particular entity; and programmatically transmitting the peer group data structure to an application for use in corresponding analytics or reporting. With this approach, in response to a request, the computer can automatically assess a large number of entity records and form a group of entities that are similar to one another or constitute peers based upon a plurality of programmed criteria.

One technical benefit of an embodiment is to improve the data processing efficiency of generating and using peer groups in the electronic procurement system. Another technical benefit of an embodiment is to generate peer groups based on various sub-attributes of a subcategory of a particular entity in the electronic procurement system. After peer groups are generated, the e-procurement system can execute other useful actions such as generating suggestions, to one peer entity, concerning suppliers that other peer entities in the group have used for similar transactions in the past.

All embodiments disclosed and claimed herein are directed to computer-implemented, programmed processes that interact with digital entity data and perform computer-implemented operations to generate a current peer group of other entities and a particular peer group data structure associated with a particular entity. Entities, groups, and metadata supporting the specified functions all are digitally stored as electronic data in digital data storage systems. All method and process operations involve computer-executed steps under the control of stored program instructions. The disclosure is not intended to and does not encompass techniques for organizing persons or for performing mental acts or steps, and any interpretation of the claims to encompass such techniques would be unreasonable based upon the disclosure as a whole. Embodiments address the technical problem of how to efficiently generate an accurate peer group of other entities and provide recommendations to the buyer entities on which supplier entity is best for a commodity, based on what the buyer entities have done.

Specific problems of prior practice have included wasteful use of computer processing resources, such as CPU usage and memory, as well as network bandwidth. By specifying entity attributes through the electronic procurement system, the system may generate a current peer group of other entities for a particular entity from a plurality of different entities and the relative performance of the peer entities at run-time. The solutions disclosed herein can improve the electronic procurement system which provides visibility into the configuration settings of a particular entity and corresponding peer group with preferred supplier entities and performance analysis, which otherwise do not share the confidential internal configuration data and peer group performance analysis. Prior systems could not provide such data. The preferred supplier entities may provide goods and services are obtained in an inexpensive and/or quality manner through the e-procurement system.

The electronic procurement system described herein provides numerous technical advantages. The electronic procurement system allows entities to control expenses, and the consumption of data processing resources involved in selecting preferred supplier entities, purchasing processes, and directing messages about purchases to the preferred suppliers using computer-based controls. This disclosure focuses on technical improvements of dynamically generating and using peer groups of entities for a particular entity with an expanded hierarchy of attributes at a subcategory level and run-time enhancements in the electronic procurement system. The hierarchy of attribute values can be based upon a public taxonomy of industry category or classification values, or a private or custom taxonomy. In an embodiment, the electronic procurement system implemented as an online, networked Software-as-a-Service (SaaS) system is disclosed. The electronic procurement system may be implemented using a virtualized data center that hosts or executes a plurality of instances of the system, to which multiple different users and entities connect.

Consequently, the disclosed techniques provide numerous technical benefits. One example is reduced use of memory, CPU cycles, network bandwidth, and other computer resources and, resulting in improved machine efficiency, for all the reasons set forth herein. Further, while the disclosure provides for programmed and applied processes using computers, those processes are directed to improvements in the electronic procurement system.

Other features, aspects, and embodiments will become apparent from the disclosure as a whole including the drawings and claims.

2.0 Structural and Functional Overview

FIG. 1 is a block diagram of an example computer network environment in which various embodiments may be implemented. In an embodiment, the computer network environment 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based clusters of computers, docker containers, virtual machine instances, or virtual machine computing elements such as virtual processors, storage and memory, data centers, storage devices, desktop computers, laptop computers, mobile devices, and/or any other special-purpose computing devices. Any reference to "a computer" herein may mean one or more computers unless expressly stated otherwise.

Computer-executable instructions described herein may be in machine-executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages, and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figures may represent the manner in which programmers or software developers organize and arrange source code for later compilation into an executable, or interpretation into bytecode or the equivalent, for execution by computer(s).

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the technical problems that have been previously described. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

FIG. 1 illustrates only one of many possible arrangements of components configured to execute the programming described herein. In an embodiment, a computer network environment 100 of an electronic procurement ("e-procurement") system may include two or more client computers 102, 108 in electronic communication with a procurement control system computer 114. The computer network environment 100 may facilitate data transmission and processing between the procurement control system computer 114 and the client computers 102, 108 using one or more networks.

The procurement control system computer 114 may include a processor 116 in signal communication with a memory 124 and an entity database 120. The procurement control system computer 114 may include various software programs or applications such as procurement applications 104 and 110. Although the procurement control system computer 114 is shown as a single computing device in FIG. 1, various instructions or procurement applications and client configuration data, such as configurations 106, 112 shown as belonging to the procurement control system computer 114 may exist on more than one computing device that operate in tandem to provide the features of the procurement control system computer 114.

The client computers 102, 108 may broadly represent desktop computers, workstations, laptop computers, or other mobile computing devices executing applications, processes or browsers that logically act as clients of the procurement control system computer 114, which acts logically as one or more servers or services. Any number of client computers 102, 108 may be provided in various embodiments and FIG. 1 depicts two client computers merely to illustrate a clear example.

The procurement control system computer 114 is in electronic communication with the client computers 102, 108 through a network. One or more networks (not shown) may be implemented by any medium or mechanism that provides for the exchange of data between the various elements of FIG. 1. Examples of one or more networks include, without limitation, a cellular network, communicatively coupled with a data connection to the computing devices over a cellular antenna, one or more Local Area Networks (LANs), one or more Wide Area Networks (WANs), one or more Ethernets or the Internet, or one or more terrestrial, satellite or wireless links, or a combination thereof. The networks may comprise one or more local area networks, wide area networks, and/or internetworks.

Each of the client computers 102, 108, may be associated with a different user, user account, or entity whose procurement activities are managed by corresponding procurement applications 104, 110. Procurement applications 104, 110 can be implemented as virtual compute instances in a cloud computing center and/or private data center. In an embodiment, the client computer 108 is associated with a second entity that is distinct from a first entity associated with the client computer 102. Different entities may be different enterprises that may access the procurement control system computer 114 to manage their procurement needs. Different entities can be associated with different commodities, business types, regions, company sizes, or other categories of different users. Different entities can comprise peers or non-peers.

The client computers 102, 108 may host or execute a web browser that is compatible with an HTTP server of computer 114, and applications 104, 110 can be structured as web applications. Using the browser, the client computers 102, 108 can access the applications and other services of the procurement control system computer 114 and interact with one of the procurement applications 104, 110. The web browser can be a commercially available application such as CHROME, SAFARI, EDGE, INTERNET EXPLORER, or FIREFOX.

The procurement application 104 may comprise different instances of the procurement application, a single executing instance of the procurement application 104 that supports a multi-tenant architecture, or a combination. Procurement control system computer 114 further comprises a relational database to store entity information, denoted entity database 120 in FIG. 1; in an embodiment, the database is a large-scale, multi-tenant database with inherent security controls to limit access of one tenant to the data of another. Thus, in a multi-tenant architecture, although a single instance of executing code may support procurement features for multiple entities, the information provided by each respective entity to the procurement application 104 is not directly shared with other entities. As one example, an entity at the client computer 102 provides information through a web browser. The entity provides data such as configurations 106 to the web browser, which is transmitted to the procurement control system computer 114.

Users or entities of the client computers 102, 108 may use the procurement applications 104, 110 to manage their procurement needs within the computer network environment 100. The procurement control system may have a number of configuration data values or settings that can be set by an entity of the system. Users or entities of the client computers 102, 108 may interact with the procurement control system computer 114 through corresponding procurement applications 104, 110 to supply different configurations 106, 112 as user inputs through the client computers 102, 108 to the procurement control system computer 114. The configurations 106, 112 may be stored on the procurement control system computer 114, or data storage devices not shown in FIG. 1. Examples of configurations 106, 112 include parameter settings that control which pages, features, or functions of the e-procurement system are available to different entities, users, or accounts. In an embodiment, configurations 106, 112 may be set based on user inputs using various user interfaces having interface elements associated with corresponding procurement applications 104 and 110. Examples of interface elements include but are not limited to checkboxes, drop-down menus, drag-and-drop selections, radio buttons, and text fields. For example, configuration 106 may include a plurality of the attributes per entity such as an industry, a primary category, a subcategory, a billing country, levels of business types, a company size, and other types of attributes. The attribute values of a particular entity may comprise corresponding values or features of the attributes.

The procurement control system computer 114 comprises, in one embodiment, one or more processors 116 which are communicatively coupled to memory 124. The processor 116 and memory 124 are shown in FIG. 1 as single functional elements for clarity, but practical embodiments can comprise any number of such elements, which can be implemented using one or more virtual compute instances and virtual storage instances. In an embodiment, memory 124 comprises peer group instructions 118 and an ordered table of matching rules 126. The processor 116 of the procurement control system computer 114 may execute peer group instructions 118 to create the ordered table of matching rules 126 based on configurations 106, 112 supplied by the client computers 102, 108. Based on the ordered table of the matching rules 126 and attribute data of a plurality of entities, the processor 116 of the procurement control system computer 114 may execute peer group instructions 118 to generate current peer groups of entities and corresponding peer group data structures 122 for the corresponding entities or clients. Because the procurement control system computer 114 has access to the configurations for different clients or entities, the procurement control system computer 114 may generate a current peer group of other entities for a particular entity based on the configurations supplied by each client or entity. Each peer group of entities may include two or more entities that are similar in some way to that of the particular entity. For example, a peer group may include two or more entities that have attributes with similar values to the attributes of the particular entity. The automatic, without human intervention, provisioning of the peer group of entities reflects the preferred supplier entities and the corresponding performance of the supplier entities through the procurement applications 104, 110.

Processor 116 of the procurement control system computer 114 may execute the peer group instructions 118 and the ordered table of matching rules 126 to process attribute data of entities registered with the procurement control system computer 114 and manage a plurality of peer group data structures 122 on behalf of the entities registered with the procurement control system computer 114. The peer group instructions 118 may be executed by the processor 116 to process a user input specifying a particular entity and a request to generate a current peer group of other entities. The peer group instructions 118 may be executed by the processor 116 to access the entity database 120 and the ordered table of the matching rules 126 to retrieve particular attributes of the particular entity and various entities supplied by the client computers 102, 108. The peer group instructions 118 may be executed by the processor 116 to read the next successive matching rule in the ordered table of the matching rules 126.

Based on the particular attributes of the particular entity, and the matching rule, the peer group instructions 118 may be executed by the processor 116 to query the entity database 120 to receive a result set of all entities having attribute values specified in the matching rule that exactly match the corresponding particular attributes of the particular entity. The peer group instructions 118 may be executed by the processor 116 to append data for matching entities in the result set to a peer group data structure 122 and determine whether a peer group size of the peer group data structure is larger than a threshold size. In response to determining that the peer group size of the peer group data structure is larger than the threshold size, the peer group instructions 118 may be executed by the processor 116 to programmatically transmit the peer group data structure to procurement application 104 or 110 for use in analytics or reporting. The peer group instructions 118 may be executed by the processor 116 to identify one or more attribute values associated with the particular entity in which the particular entity is associated with its peer entities.

The peer group instructions 118 may be executed by the processor 116 to use supplied configurations associated with the peer entities, identify configurations or attributes supplied by the particular entity using the client computer 102, 108 and determine how they are similar to or different from those of the peer entities. The identified configurations or attributes may include configuration data that is known to affect the attributes or sub-attributes of the particular entity.

The peer group instructions 118 may be executed by the processor 116 to generate a user interface or user interface elements that can be used by a user to modify the identified configurations. The peer group instructions 118 may be executed by the processor 116 to assemble the identified configuration, such as corresponding configurations associated with the peer entities and text to present a relationship between the identified configuration and a configuration for the particular entity. Further, the peer group instructions 118 may be executed by the processor 116 to conduct the performance analytics based on the configurations 106 provided by the particular entity, a description of a peer group and a corresponding peer group data structure for the particular entity.

The peer group instructions 118 may be executed by the processor 116 to access the configuration and performance data of the peer entities and identify peer entities who may be preferred and beneficial supplier entities. The peer group instructions 118 may be executed by the processor 116 to determine attributes of the configurations of the particular entity which has a relationship with the preferred and beneficial supplier entities in the peer group. The peer group instructions 118 may be executed by the processor 116 to identify differences between the preferred and beneficial supplier entities in the peer group for the particular entity. The peer group instructions 118 may be executed by the processor 116 to generate a user interface or user interface elements to present the configuration data of a particular entity and the corresponding performance data of the peer entities.

Entity database 120 may store a plurality of peer group data structures 122. A peer group represents a plurality of peer entities that are within the same category as the particular entity in terms of attribute values, such as revenue, transaction measures, number of employees, and/or industry. Examples of the plurality of the attributes per entity may include industry, a primary category, a subcategory, a billing country, business types, a company size and other types of attributes. The plurality of the attributes associated with a plurality of entities are supplied by each respective entity that uses the procurement applications 104, 110. For example, the attribute values may be values provided by an entity during a sign-up process with the procurement application 104 or during routine updates to entity information requested by the procurement application 104.

3. Procedural Overview

Figure 2:
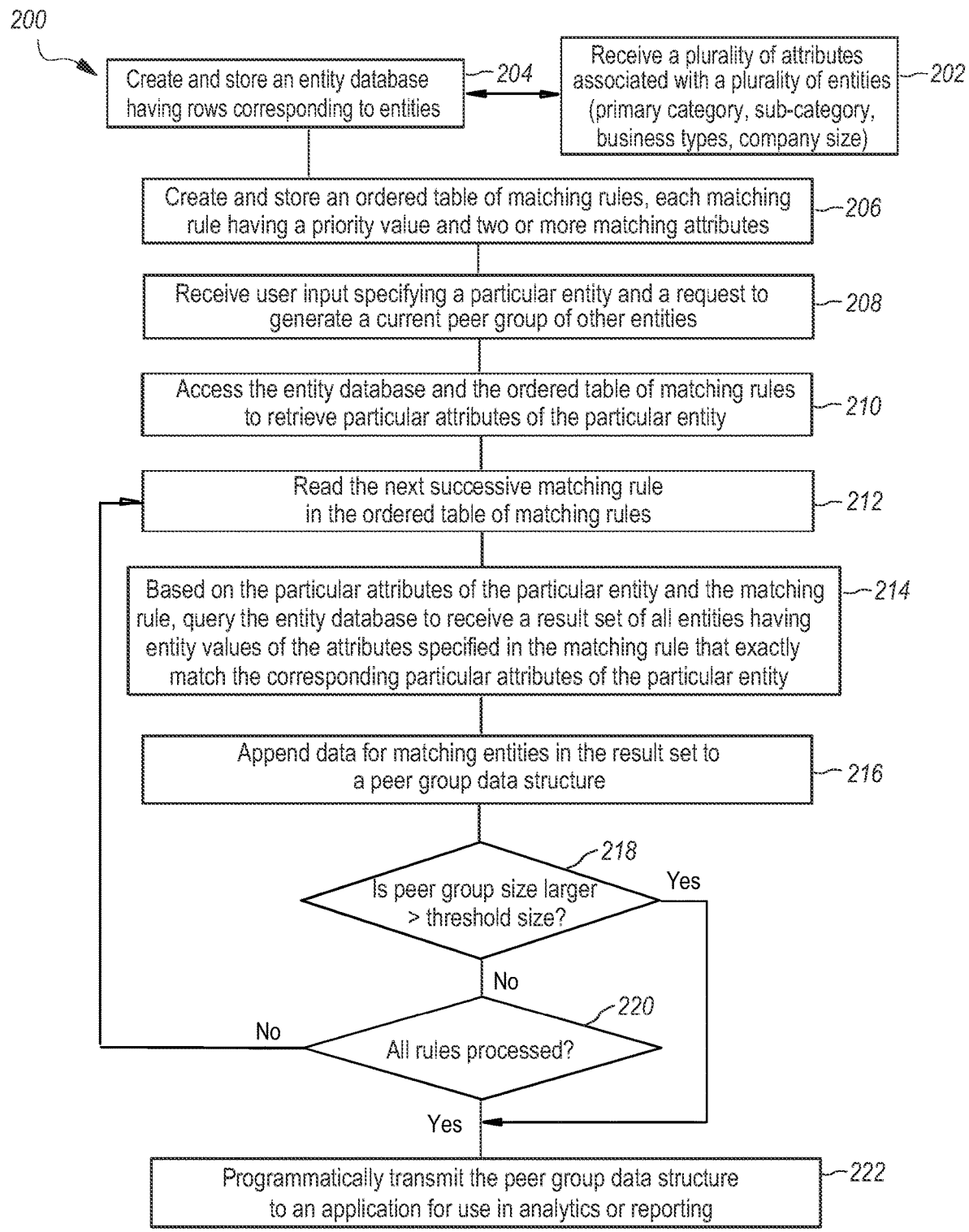
FIG. 2 is a flow diagram illustrating an example process for dynamically generating and using peer groups.

FIG. 2 is a flow diagram illustrating an example process for dynamically generating and using peer groups. FIG. 2, and each other diagram herein, is intended to disclose an algorithm, plan or outline that can be used to implement one or more computer programs or other software elements which when executed cause performing the functional improvements and technical advances that are described herein. Thus, FIG. 2 and each other diagram herein are intended as an illustration of the functional level at which skilled persons, in the art to which this disclosure pertains, communicate with one another to describe and implement algorithms using programming. The flow diagram is not intended to illustrate every instruction, method object, or sub-step that would be needed to program every aspect of a working program, but is provided at the high, functional level of illustration that is normally used at the high level of skill in this art to communicate the basis of developing working programs.

In an embodiment, a computer-implemented process 200 of FIG. 2 is programmed to dynamically generate and use peer groups for a particular entity using the peer group instructions 118 executed by the procurement control system computer 114. For example, the particular entity may be a client computer 102 that is associated with the particular entity that supplies configurations 106 to the procurement control system computer 114 through the procurement application 104.

3.1 Dynamically Generating and Using Peer Groups

In operation 202, the procurement control system computer 114 may receive a plurality of attributes associated with a plurality of entities from client computers 102, 108 associated with entities. For example, the plurality of the attributes may comprise an industry, a primary category, a subcategory, a billing country, business type, and a company size. In some embodiments, users or entities may access the procurement applications 104, 110 through the client computers 102, 108 to communicate with the procurement control system computer 114 through a network. Users or entities may register with the procurement control system computer 114 with entity data which includes a plurality of attributes associated with the corresponding users and entities. In some embodiments, the plurality of the attributes may include an industry, a primary category, a subcategory, a billing country, a business type, a company size, and other types of attributes. The plurality of the attributes associated with an entity may be categorized as a plurality of variables or categories of an entity. A subcategory may be represented by one or a plurality of sub-categories associated with the entity. The plurality of the attributes may include additional information associated with the entity, such as revenue, transaction measures, number of employees, and industry.

In operation 204, the procurement control system computer 114 may access and/or create and store an entity database 120 to include a plurality of rows associated with a plurality of entities. Each row has a plurality of attributes associated with a particular entity and includes values of a plurality of hierarchical attributes of a plurality of variables. The plurality of the variables of the particular entity may be arranged with corresponding attributes or attribute values in a decreased priority order along each row. When the same user or another user associated with the particular entity accesses the procurement application 104 to communicate with the procurement control system computer 114, the plurality of the attributes associated with a particular entity may be retrieved from the entity database 120 by the procurement application 104 and processed to generate a corresponding peer group.

FIG. 3A illustrates an example priority rank file 300A with a plurality of attributes associated with an entity. The example priority rank file 300A may include a plurality of variables 302 associated with an entity. The plurality of the variables 302 of the entity may include but is not limited to, commodity, business type, region, company size, or other variables. Each variable 302 may include a set of attributes 304 corresponding to a set of hierarchical attribute values. Each hierarchical level 306 of an attribute 304 may be represented by one of the hierarchical attribute values indicative of a set of digital values. The attributes 304 for the variable 302 of an entity may be provided by an entity during a sign-up process with the procurement application 104 or during routine updates to entity information requested by the procurement application 104. For example, a variable 302 specifying the "Commodity" of an entity may include a set of two attributes 304, such as "primary category" and "subcategory." The set of two attributes 304 of "Commodity" correspond to two hierarchical levels 306 which are indicative of two hierarchical attribute values.

A variable 302 of "Business Type" of an entity may include a set of four attributes 304, such as "business type level 3," "business type level 2," "business type level 1," and "all business types." The set of four attributes 304 of the "Business Type" correspond to four hierarchical levels 306 which are indicative of four hierarchical attribute values. A variable 302 of "region" may include a set of three attributes 304, such as "billing country," "super region," and "global." The set of three attributes 304 of "Region" correspond to three hierarchical levels 306 which are indicative of three hierarchical attribute values. A variable 302 of "company size" may include a set of three attributes 304, such as "same company size," "+/−1 company size", and "all company sizes." The set of three attributes 304 of "Company Size" correspond to three hierarchical levels 306 which are indicative of three hierarchical attribute values.

In operation 206, the procurement control system computer 114 may create an ordered table 300B of matching rules 126 based on a plurality of attributes associated with each entity. Each matching rule may include a priority value and two or more matching attributes. The procurement control system computer 114 may store the ordered table 300B of matching rules in memory 124. Details related to creating the ordered table 300B of the matching rules 126 are further described in other sections in connection with FIG. 4.

In some embodiments, the procurement control system computer 114 may create and use, in determining peer groups, an ordered table 300B of matching rules 126 based on an example priority rank file 300A with a plurality of attributes associated with each entity. FIG. 3B illustrates a diagram of an example ordered table 300B of matching rules 126 with example hierarchy rankings R1-R18 in accordance with one or more embodiments. Each of the hierarchy rankings R1-R18 may be represented by a digital priority value. Thus, integer values in the hierarchy ranking column of table 300B specify a priority rank of the corresponding row, with a rule represented in the row with rank "1" to be evaluated first, and the rule marked "18" to be evaluated last, in this example. Each row of table 300B represents attribute values of a matching rule. For example, the attribute of "Sub Commodity" represents an attribute of a subcategory associated with a first variable "Commodity Category" of a particular entity or instance. Therefore, under the first row or rule denoted "1," attribute values of a particular enterprise, instance, or target entity will match records in the database 120 for entities having the same values for Sub Commodity, Business Type 3, Country, and Same Revenue Class.

The particular entity may include a set of variables or categories arranged in a decedent order of priority along each row of the example ordered table 300B, such as "Commodity," "Business Type," "Region," and "Company Size".

In operation 208, the procurement control system computer 114 may receive a user input specifying a particular entity and a request to generate a current peer group of other entities through the procurement application 104. A user or entity may access the procurement application 104 through the client computer 102 to provide the user input as configuration 106 which may specify a particular entity and a request to generate a current peer group of other entities. For example, the procurement control system computer 114 may receive the user input specifying a matching attribute of the commodity associated with the particular entity. through the procurement application 104. the procurement control system computer 114 may generate the current peer group of other entities based on a particular matching rule associated with the matching attribute of the commodity.

In operation 210, the procurement control system computer 114 may access the entity database 120 and the ordered table 300B of the matching rules to retrieve particular attributes of the particular entity. The particular attributes of the particular entity may be arranged corresponding to the two or more matching attributes associated with corresponding variables in a decreased priority order. In some embodiments, accessing the entity database and the ordered table of the matching rules to retrieve particular attributes of the particular entity comprises querying the entity database to determine the current peer group of other entities based on the ordered table of the matching rules using an algorithm of structured query language (SQL).

In operation 212, the procurement control system computer 114 may read or retrieve the next successive matching rule in the ordered table 300B of the matching rules 126 from memory 124.

In operation 214, the procurement control system computer 114 may query the entity database 120 to receive a result set of all entities which have attribute values of the attributes specified in the matching rules that exactly match the corresponding particular attributes of the particular entity based on the particular attributes of the particular entity and the matching rules. The result set of all entities may form a peer group of matching entities associated with the particular entity.

In operation 216, the procurement control system computer 114 may append data for matching entities in the result set to a peer group data structure 122. Thus, operation 216 can be programmed to update the peer group data structure 122 to add matching entities, in effect building a digitally stored list of peer entities.

In operation 218, the procurement control system computer 114 may determine whether a peer group size of the peer group data structure 122 is larger than a threshold size of a peer group for the particular entity. The peer group size of the peer group data structure 122 represents a number of matching entities of the peer group.

In operation 220, the procurement control system computer 114 may determine whether each of the ordered table 300B of the matching rules is processed in response to determining that the peer group size of the peer group data structure is not larger than the threshold size. In response to determining that each of the ordered table 300B of the matching rules 126 is processed, the procurement control system computer 114 may iteratively return to operation 212 to read the next successive matching rule in the ordered table 300B of the matching rules 126. In response to determining that each of the ordered table 300B of the matching rules 126 is processed, process 200 continues to execute operation 220.

In operation 222, in response to determining that the peer group size of the peer group data structure 122 is larger than the threshold size, the procurement control system computer 114 may programmatically transmit the peer group data structure 122 to an application such as the procurement application 104 for use in analytics or reporting. The procurement control system computer 114 may present the attributes of the peer entities in a graphical element that depicts the relative performance of the particular entity based on corresponding attribute values. Details related to the analytics or reporting of an example peer group and the peer group data structure will be described in FIG. 5A and FIG. 5B below.

3.2 Matching Rules for Generating a Peer Group

Figure 4:
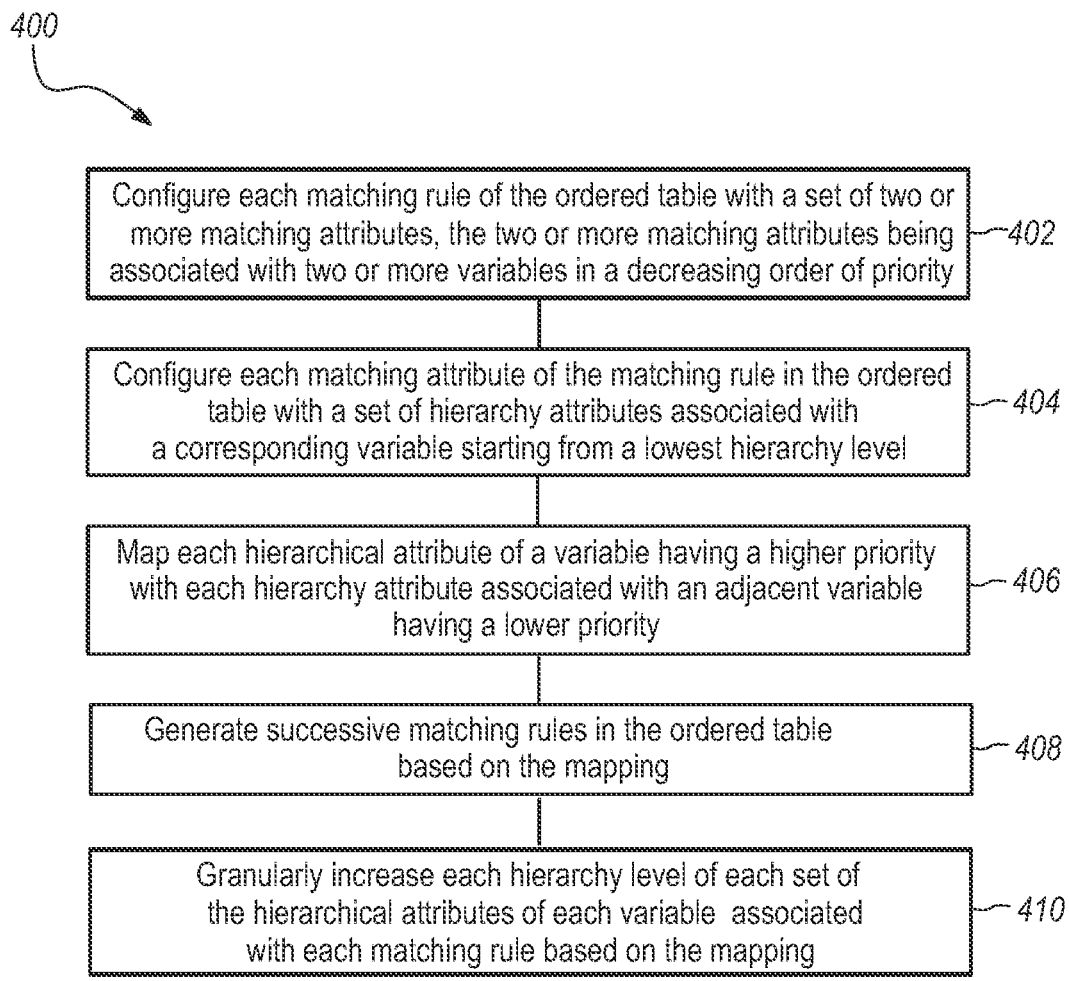
FIG. 4 is a flow diagram illustrating an example process for creating an ordered table of matching rules.

In an embodiment, a table of matching rules can be generated automatically using an iterative approach. FIG. 4 is a flow diagram illustrating an example process for creating an ordered table 300B of matching rules 126. In an embodiment, the ordered table 300B of matching rules 126 in FIG. 3B may be created based on an example priority rank file 300A illustrated in FIG. 3A.

In operation 402, the procurement control system computer 114 may configure each matching rule of the ordered table 300B with a set of two or more matching attributes associated with a particular entity. The two or more matching attributes may be associated with two or more variables in decreasing order of priority respectively.

As illustrated in FIG. 3A, a first variable of "Commodity" may include a first set of hierarchy attributes, such as "Sub Commodity" and "Primary Commodity." The procurement control system computer 114 may configure the first set of the hierarchy attributes in an increasing hierarchy level from a lowest hierarchy level along the first column in the example ordered table 300B of matching rules 126. A second variable of "Business Type" may include a second set of hierarchy attributes, such as "Business Type 3," "Business Type 2," and "Business Type 1" which are arranged in an increasing hierarchy level from the lowest hierarchy level along the second column in the example ordered table 300B of matching rules 126. The procurement control system computer 114 may configure the second set of the hierarchy attributes in an increasing hierarchy level from the lowest hierarchy level along the second column in the example ordered table 300B of matching rules 126. A third variable of "Region" may include a third set of hierarchy attributes, such as "Country," and "Super Region."

The procurement control system computer 114 may configure the third set of the hierarchy attributes in an increasing hierarchy level from the lowest hierarchy level along the third column in the example ordered table 300B of matching rules 126. A fourth variable of "Company Size" may include a fourth set of hierarchy attributes, such as "Same Revenue Class," "Adjacent Revenue Class," and "All Companies." The variables or categories of "Commodity," "Business Type," "Region," and "Company Size" are arranged in the decedent order of priority along each row of the example ordered table 300B of matching rules 126. The procurement control system computer 114 may configure the fourth set of the hierarchy attributes in an increasing hierarchy level from the lowest hierarchy level along the fourth column in the example ordered table 300B of matching rules 126.

In operation 404, the procurement control system computer 114 may configure each matching attribute of the matching rule in the ordered table 300B with a set of hierarchy attributes associated with a corresponding variable starting from the lowest hierarchy level. For example, the first matching rule R1 may include the lowest hierarchy attribute "Sub Commodity" of the first variable of "Commodity Category," the lowest hierarchy attribute "Business Type 3" of the second variable of "Business Type," the lowest hierarchy attribute "Country" of the third variable of "Region," and the lowest hierarchy attribute "Same Revenue Class" of the fourth variable of "Company Size."

In operation 406, the procurement control system computer 114 may map each hierarchical attribute of a variable having a higher priority with each hierarchy attribute associated with an adjacent variable having a lower priority. The procurement control system computer 114 may generate a first stage mapping between the first variable and second variable by mapping the hierarchical attribute "Sub Commodity" of the first variable of "Commodity Category" to each hierarchy attribute associated with the second variable of "Business Type." For example, the procurement control system computer 114 may map the attribute of "Sub Commodity" to the second set of hierarchy attributes associated with an adjacent variable of "Coupa Business," such as "Business Type 3," "Business Type 2," and "Business Type 1." The procurement control system computer 114 may generate a second stage mapping between the second variable and third variable by mapping each hierarchical attribute of the second variable of "Business Type" to each hierarchy attribute associated with the third variable of "Region." For example, the procurement control system computer 114 may map the attribute of "Business Type 3,"

to each of the third set of hierarchy attributes associated with third variable of "Region," such as "Country," and "Super Region." The procurement control system computer 114 may generate a third stage mapping between the third variable and fourth variable by mapping each hierarchical attribute of the third variable of "Region" to each hierarchy attribute associated with the fourth variable of "Company Size." For example, the procurement control system computer 114 may map the attribute of "Business Type 3" of the third variable of "Region" to each of the fourth set of the hierarchy attributes associated with the fourth variable of "Same Revenue Class," "Adjacent Revenue Class," and "All Companies."

In operation 408, the procurement control system computer 114 may generate successive matching rules in the ordered table 300B based on the mapping. As illustrated in FIG. 3B, the procurement control system computer 114 may concatenating the first state mapping, the second stage mapping, and the third stage mapping to generate the ordered table of matching rules corresponding to a set of hierarchical rankings R1-R18 in FIG. 3B. The second state mapping is dependent on the first stage mapping. The third state mapping is dependent on the second stage mapping. The fourth state mapping is dependent on the third stage mapping.

In operation 410, the procurement control system computer 114 may granularly increase each hierarchy level of each set of the hierarchical attributes of each variable associated with each matching rule based on the mapping. Each mapping rule includes the mapping relationships of the first state mapping, the second stage mapping, and the third stage mapping.

4.0 Application Examples

Using the approach of section 3.1, for attribute values of a target entity, each of the matching rules of FIG. 3B is evaluated successively against records of entities in database 120, and the peer group data structure 122 is updated until the number of entities in the peer group data structure equals a threshold size. At that point, the peer group data structure 122 identifies entities that qualify as peers of the target entity, and the entities in the peer group data structure can be used for other purposes such as calculating benchmark data across peers, calculating KPIs for peer entities, recommending suppliers that peer entities have used but the target entity does not use, and other operations. This section explores example applications and uses of digitally stored peer group data that can be implemented alone or together in an embodiment.

In one embodiment, the procurement control system computer 114 can be programmed to generate and display a visual, structured representation, in a graphical user interface, of the peer group data that was assembled using the approaches described in the preceding sections. FIG. 5A illustrates a plurality of example attributes associated with a particular entity and an example peer group of matching entities associated with the particular entity. In various embodiments, the graphical visualization can comprise a web page, a graphical display in a mobile device application, an electronic document in a portable format, or any other means of visually presenting the data of FIG. 5A on a computer display device.

In the example of FIG. 5A, a graphical visualization comprises a plurality of example entity attributes 502 and an example peer group 504 associated with a particular entity or instance denoted "Bigbox." The entity attributes 502 acts as a header to visually display the attribute values that the system used to inspect data in database 120 to form a peer group. In the example, the target entity "Bigbox" has an "Industry_v2" value of "Retail & Hospitality," a primary category of "Marketing Services and Supplies," a subcategory of "Photography, Film, and Video," a billing category of "United States," a "Business Type Level 1" value of "Retail, Wholesale & Distribution," a "Business Type Level 2" value of "Retail, Stores, & Services Centers," a "Business Type Level 3" value of "Clothing, Cosmetics & Apparel Stores," and a company size value of ENT referring to a large enterprise. Attributes such as "Industry_v2," primary category, subcategory, "Business Type Level 1," "Business Type Level 2," and "Business Type Level 3" can come from a public taxonomy of industry category or classification values, or a private or custom taxonomy.

While the "Industry_v2" value of "Retail & Hospitality" provides one way to group entities based upon their industry, the techniques of this disclosure for determining peer groups can replace industry-based grouping with far more tailored and accurate grouping. FIG. 5A can serve to contrast the performance of the peer group methodology of the present disclosure to industry-based grouping. For example, the value of "Industry_v2" can be seen as a high-level, less-accurate version of the data carried by "Business Type Level 1," "Business Type Level 2," and "Business Type Level 3." In the example of FIG. 5A, the entity BigBox would only be mapped to EyeStore, SoftClothes, Fifth Ave Jewels, Discount Store, Fabric Store and Pro Fish Store, as they all share the same Industry_v2 variable ("Retail & Hospitality"). With the techniques of the present disclosure for determining peer groups, in addition to the entities listed above, Workout Wear, Edu Charity, Office Store, and Leggings Outlet would also be included as a peer. Thus, the techniques of the present disclosure determine that certain entities, which would have been excluded from the industry group, are good peers for BigBox because they match well to the attributes from Primary Category to Company Size.

The procurement control system computer 114 may generate an example peer group 504 associated with the particular entity of "BigBox" and include a list of matching entities in the result set corresponding to a column of "Instance". In the example of FIG. 5A, a peer group 504 comprises ten entities having the fictitious business names specified under the "Instance" attribute, such as EyeStore, SoftClothes, WorkoutWear, and others. Each entity name is associated with values of the same attributes shown in the example for entity attributes 502, such as primary category, subcategory, and so forth. When multiple entities in the peer group 504 have identical values for a particular attribute, in an embodiment, the graphical visualization is programmed to display a single common visual block containing the value of the attribute. For example, all ten entities in peer-group example 504 have the value "Marketing Services and Supplies" for the primary category, and the label "Marketing Services and Supplies" is shown in a single visual block. Similarly, the attributes of subcategories Business Type Level 1, and Business Type Level 2 each have a single visual block with a value of the attribute. Furthermore, the first nine entities in peer group example 504 have the value "United States" for the billing category attribute, an one entity has "Canada"; therefore, a single visual block spanning nine entity names is displayed in the graphical visualization to represent the nine values of "United States" and a single block shows the value "Canada" aligned with the tenth entity named "Leggings Outlet." In this manner, the structure and arrangement of the graphical visualization rapidly and efficiently communicate, using a minimum number of presentation instructions and/or HTML code, attribute values that peer entities share in common. Consequently, users viewing the graphical visualization can rapidly infer how the entities in the peer group example 504 are similar and/or why they were selected; thus, the graphical visualization provides explainable data output to the user as well as an efficient and compact presentation. In one embodiment, an order of the instances or entities in the peer group example 504 conforms to hierarchy rankings of the entities based on matching attributes.

FIG. 5B illustrates an example peer group detail report that visually presents aggregated data concerning entities that match a target entity as potential peers based upon a plurality of different matching rules. In this description, the label "coupa" is used to illustrate one possible implementation of Coupa Software Incorporated, San Mateo, California, but other embodiments may use other labels or terms and "coupa" is not required. A target entity, which is the subject of the detail report, is defined by a plurality of attributes 506. In the example, the attributes and values of the target entity specify an instance value of "coupa_purchasing," "Business Type 1" value of "Technology," "Business Type 2" value of "Information Technology," "Business Type 3" value of "Software Application Development," "Country" value of "United States," and "Super Region" value of "US," and a "Size" value of "MM."

The body of FIG. 5B below the example attributes 506 visually depicts a plurality of rows, each row corresponding to a subcategory value. Each row further comprises column values for aggregate invoice value, percentage of a running total or sum of invoice values, a logic rank value, a count of peers, a hierarchy ranking, an example commodity category, a business type, a region, and a company value. The example commodity category, a business type, a region, and a company value correspond to attributes of the matching rules of FIG. 3B. The hierarchy ranking value specifies an order in which the attributes matched the example attributes 506. Thus, the first hierarchy ranking value of "1" specifies the best match to the example attributes 506, and successively higher ranking values of "2," "3," etc. represent progressively worse matches.

Consequently, FIG. 5B indicates that for the example attributes 506, the best match of a subcategory is entities classified as providing "Web Hosting Services." These entities conducted transactions in computer network environment 100 having an invoice value of "47,940,443," representing 23.19% of all invoice volume considered in the system. Based on the count of peers value, 27 entities fall into a peer group limited to this subcategory. Those peers matched the target entity, via example attributes 506, on sub commodity, Business Type 3, country, and same revenue class, as indicated in the first row adjacent to hierarchy ranking "1." In this manner, the graphical visualization of FIG. 5B provides explainable data to detail which business categories of other entities transacting in the system represent potential peers and to what degree, across multiple different attributes.

The explainable data also shows the magnitude of data relating to other categories of entities that could be peers based on different parameter values, did not qualify as peers, or are poor matches as peers. For example, different values of the subcategory value match the example attributes 506 to different degrees, resulting in different counts of peers. For each subcategory of the particular entity, the procurement control system computer 114 may generate a current peer group of other entities and peer group data in different rows of FIG. 5B. In some embodiments, the logic ranking in FIG. 5B represents a corresponding hierarchy ranking in a corresponding ordered table of matching rules illustrated in the continued FIG. 5B. The corresponding attribute values of the matching entities may include a transaction measure, a range of the transaction measure, and any other attributes associated with the particular entity. The transaction measure may be associated with a commodity in a transaction invoice. The procurement control system computer 114 may arrange the current peer group of other entities for the particular entity with the result set of matching entities have the matching attribute in a decreased priority order.

Figure 6:
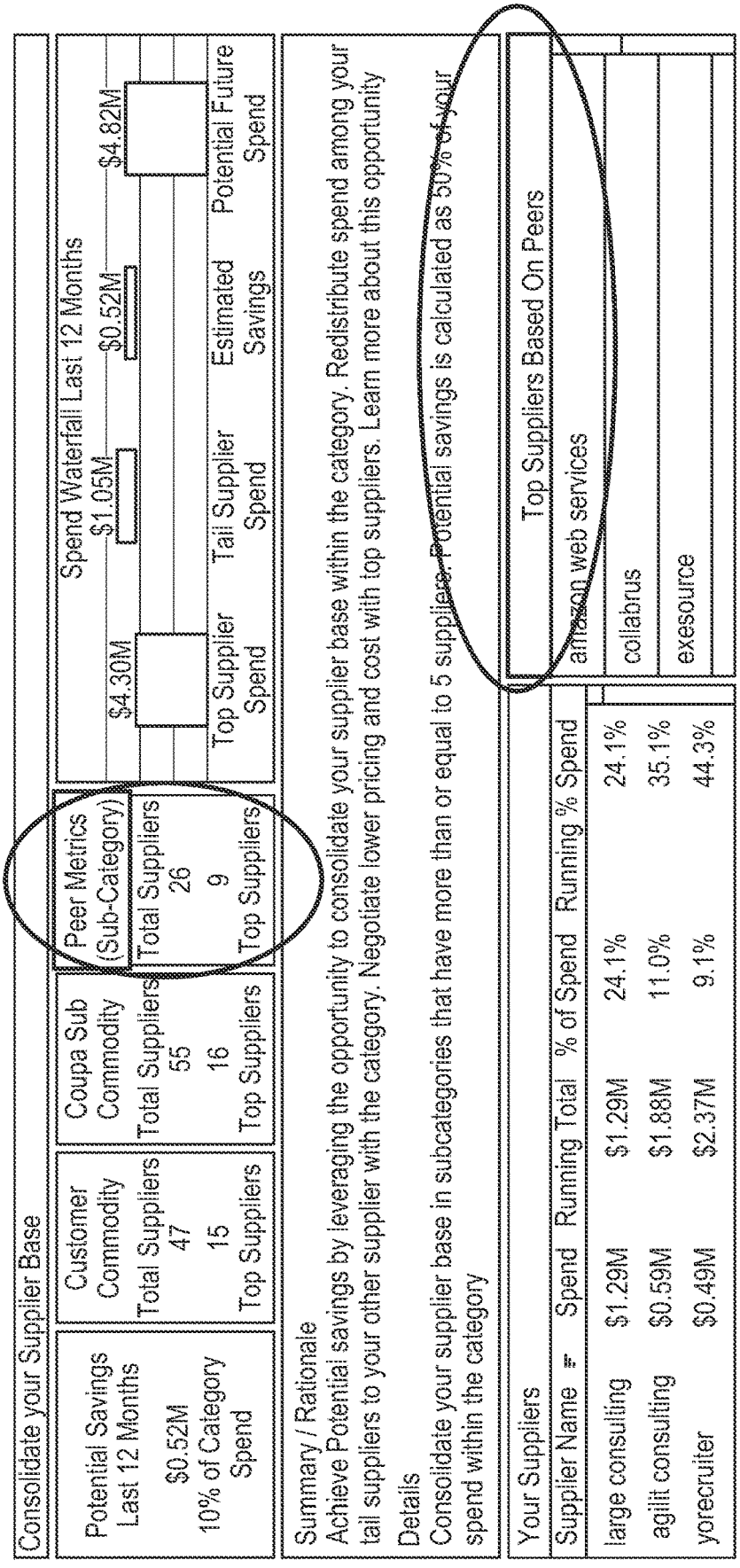
FIG. 6 illustrates an example graphical user interface for presenting information about peer groups corresponding to different sub-attributes of an entity.

FIG. 6 illustrates an example graphical user interface comprising a dashboard for presenting information about peer entities corresponding to different sub-attributes of an entity. In the example of FIG. 6, for a particular instance of the e-procurement application, named "coupa_purchasing," the commodity "Recruiting" has been mapped for peer selection purposes to the parent commodity "People Services" and the commodity HUMAN RESOURCES SERVICES. This mapping yielded 49 peers instances, enterprises, or entities in a peer group. The dashboard comprises a graphical panel titled "Potential Savings Last 12 Months," which shows "$0.52 M [or] 10% of Category Spend" in this example. To generate the panel, the procurement control system computer 114 can be programmed to read and compare transactions in database 120 for the specified instance and all entities in the peer group, and to determine the difference in spending of the group versus the current instance.

The dashboard also comprises a "Customer Commodity" panel indicating that 47 total supplier are known for the specified commodity of "Recruiting." The total includes 15 "Top Suppliers" that have been calculated to supply the majority of products or services to peer entities.

The dashboard further comprises a visual panel titled "Sub Commodity" that reports counts of total suppliers and top suppliers for the sub commodity of RECRUITING.

The dashboard further comprises a visual panel titled "Peer Metrics (Sub-Category)" that reports total suppliers and top suppliers as used by peer entities who purchase in the same subcategory.

The dashboard further comprises a "Spend Waterfall" bar chart that displays the volume of spending that has occurred for the top supplier and for the lowest or "tail" supplier. An estimated savings value represents an amount in spending that could be saved if transactions involving the "tail" supplier are redirected to one of the top suppliers. The values for tail suppliers and estimated savings may be different when it is not possible to move all the tail supplier spending to a top supplier, based on commodity, location, or other factors. The potential future spend is shown.

The dashboard also comprises a list of the current entity's suppliers and a list of top suppliers to peers in the peer group.

For example, peer metrics of a subcategory of the particular entity may include a total of 26 suppliers with 9 top suppliers which are identified as peer entities in a peer group associated with the particular entity "coupa purchasing". The procurement control system computer 114 may present the current peer group of other entities with the particular attribute associated with the particular entity in a drop-down menu on a graphical user interface of the procurement control system. The procurement control system computer 114 may present a list of top supplier entities in the peer entities associated with the particular entity. The procurement control system computer 114 may consolidate the supplier entities in subcategories that have more than or equal to 5 suppliers and provide the user potential savings within a category.

The disclosed system described in the present disclosure is particularly integrated into a practical application which leads to technical advantages of efficiently generating the current peer group of other entities. The practical application further provides performance analysis based on peer group data structures and provide inexpensive and/or quality peer entities for the particular entity in run-time through the e-procurement system.

5.0 Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques.

Figure 7:
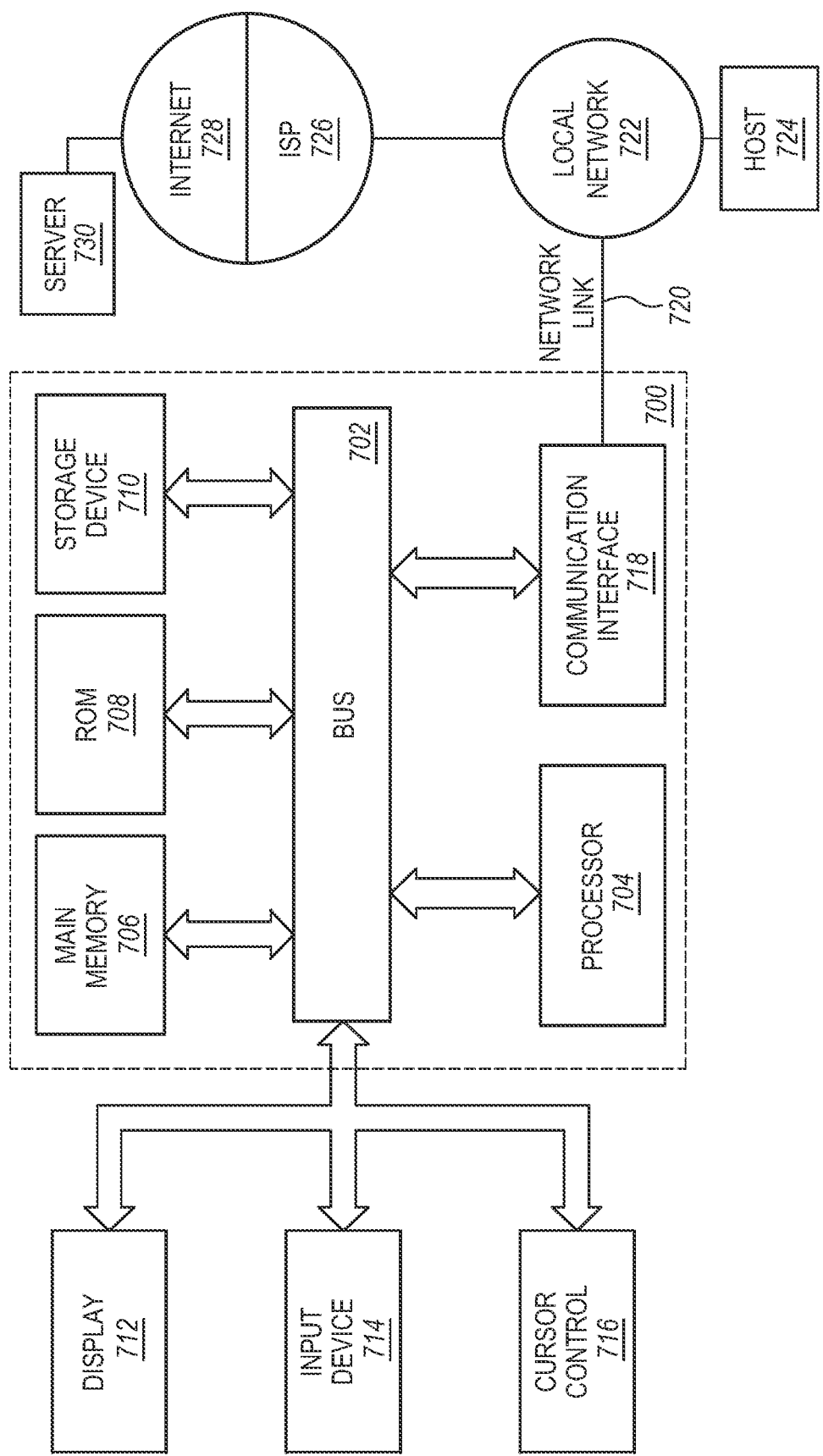
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system 700 causes or programs the computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed by a processor of an electronic procurement control system, the method comprising:
    creating and storing an entity database having rows corresponding to entities, each row having a plurality of attributes per entity;
    creating and storing an ordered table of matching rules, each matching rule having a priority value and two or more matching attributes;
    receiving a user input specifying a particular entity and a request to generate a current peer group of other entities;
    accessing the entity database to retrieve particular attributes of the particular entity based on the ordered table of the matching rules;
    reading a next successive matching rule in the ordered table of the matching rules;
    based on the particular attributes of the particular entity, and the matching rules, querying the entity database to receive a result set of matching entities as the current peer group of other entities for the particular entity, wherein the matching entities in the result set have attribute values of the attributes specified in the matching rules that exactly match the corresponding particular attributes of the particular entity;
    appending data for the matching entities in the result set to a peer group data structure associated with the particular entity;
    determining whether a peer group size of the peer group data structure associated with the particular entity is larger than a threshold size; and
    in response to determining that the peer group size of the peer group data structure is larger than the threshold size associated with the particular entity, programmatically transmitting the peer group data structure to an application for use in corresponding analytics or reporting.

2. The computer-implemented method of claim 1, wherein creating and storing the ordered table of the matching rules comprises:
    configuring each matching rule of the ordered table with a set of two or more matching attributes, the two or more matching attributes being associated with two or more variables in a decreasing order of priority;
    configuring each matching attribute of the matching rule in the ordered table with a set of hierarchy attributes associated with a corresponding variable starting from a lowest hierarchy level;
    mapping each hierarchical attribute of a variable having a higher priority with each hierarchy attribute associated with an adjacent variable having a lower priority;
    generating next successive matching rules in the ordered table based on the mapping; and
    granularly increasing each hierarchy level of each set of the hierarchical attributes of each variable associated with each matching rule.

3. The computer-implemented method of claim 2, wherein the two or more variables in the decreasing order comprises two or more of commodity, business type, geography region and entity size, and wherein each set of hierarchy attributes associated with each variable have a set of corresponding hierarchical attribute values with hierarchical levels.

4. The computer-implemented method of claim 1, further comprising:
    in response to determining that the peer group size of the peer group data structure is not larger than the threshold size, determining whether each ordered table of the matching rules is processed; and
    in response to determining that each ordered table of the matching rules is not processed, iteratively reading the next successive matching rule in the ordered table of the matching rules.

5. The computer-implemented method of claim 1, further comprising:
    in response to determining that each ordered table of the matching rules is processed,
    programmatically transmitting the peer group data structure to the application for use in the corresponding analytics or reporting.

6. The computer-implemented method of claim 1, further comprising:
- receiving the plurality of the attributes from a client computer associated with an entity, wherein the plurality of the attributes comprises an industry, a primary category, a subcategory, a billing country, business types, and a company size;
- receiving a user input of an updated set of attributes associated with the particular entity;
- updating the ordered table of the matching rules based on the updated attributes and corresponding hierarchical level; and
- generating an updated peer group data structure associated with the particular entity based on the ordered table of the matching rules.

7. The computer-implemented method of claim 1, wherein accessing the entity database and the ordered table of the matching rules to retrieve particular attributes of the particular entity comprises:
- querying the entity database to determine the current peer group of other entities based on the ordered table of the matching rules using an algorithm of structured query language (SQL).

8. The computer-implemented method of claim 2, wherein the higher priority of the variables of the particular entity data is associated with a commodity, and wherein each of hierarchical attribute values associated with the commodity represents a transaction measure or a range of the transaction measure.

9. The computer-implemented method of claim 8, further comprising:
- receiving the user input specifying a matching attribute of the commodity associated with the particular entity; and
- generating the current peer group of other entities based on a particular matching rule associated with the matching attribute of the commodity.

10. The computer-implemented method of claim 9, further comprising:
- presenting the current peer group of other entities with the particular attribute associated with the particular entity in a drop-down menu on a graphical user interface of the electronic procurement control system; and
- arranging the current peer group of other entities for the particular entity with the result set of matching entities having the matching attribute in a decreased priority order.

11. An electronic procurement control system for improving performance of a computer procurement application comprising:
- one or more processors;
- a non-transitory machine-readable medium having instructions embodied thereon, the instructions, when execute, perform operations comprising:
- creating and storing an entity database having rows corresponding to entities, each row having a plurality of attributes per entity;
- creating and storing an ordered table of matching rules, each matching rule having a priority value and two or more matching attributes;
- receiving a user input specifying a particular entity and a request to generate a current peer group of other entities;
- accessing the entity database to retrieve particular attributes of the particular entity based on the ordered table of the matching rules;
- reading a next successive matching rule in the ordered table of the matching rules;
- based on the particular attributes of the particular entity, and the matching rules, querying the entity database to receive a result set of matching entities as the current peer group of other entities for the particular entity, wherein the matching entities in the result set have attribute values of the attributes specified in the matching rules that exactly match the corresponding particular attributes of the particular entity;
- appending data for the matching entities in the result set to a peer group data structure associated with the particular entity;
- determining whether a peer group size of the peer group data structure associated with the particular entity is larger than a threshold size; and
- in response to determining that the peer group size of the peer group data structure is larger than the threshold size associated with the particular entity, programmatically transmitting the peer group data structure to an application for use in corresponding analytics or reporting.

12. The electronic procurement control system of claim 11, wherein creating and storing the ordered table of the matching rules comprises:
- configuring each matching rule of the ordered table with a set of two or more matching attributes, the two or more matching attributes being associated with two or more variables in a decreasing order of priority;
- configuring each matching attribute of the matching rule in the ordered table with a set of hierarchy attributes associated with a corresponding variable starting from a lowest hierarchy level;
- mapping each hierarchical attribute of a variable having a higher priority with each hierarchy attribute associated with an adjacent variable having a lower priority;
- generating next successive matching rules in the ordered table based on the mapping; and
- granularly increasing each hierarchy level of each set of the hierarchical attributes of each variable associated with each matching rule.

13. The electronic procurement control system of claim 12, wherein the two or more variables in the decreasing order comprises two or more of commodity, business type, geography region and entity size, and wherein each set of hierarchy attributes associated with each variable have a set of corresponding hierarchical attribute values with hierarchical levels.

14. The electronic procurement control system of claim 11, further comprising:
- in response to determining that the peer group size of the peer group data structure is not larger than the threshold size, determining whether each ordered table of the matching rules is processed; and
- in response to determining that each ordered table of the matching rules is not processed, iteratively reading the next successive matching rule in the ordered table of the matching rules.

15. The electronic procurement control system of claim 11, further comprising:
- in response to determining that each ordered table of the matching rules is processed,
- programmatically transmitting the peer group data structure to the application for use in the corresponding analytics or reporting.

16. The electronic procurement control system of claim 11, further comprising:
  receiving the plurality of the attributes from a client computer associated with an entity, wherein the plurality of the attributes comprises an industry, a primary category, a subcategory, a billing country, business types, and a company size;
  receiving a user input of an updated set of attributes associated with the particular entity;
  updating the ordered table of the matching rules based on the updated attributes and corresponding hierarchical level; and
  generating an updated peer group data structure associated with the particular entity based on the ordered table of the matching rules.

17. The electronic procurement control system of claim 11, wherein accessing the entity database and the ordered table of the matching rules to retrieve particular attributes of the particular entity comprises:
  querying the entity database to determine the current peer group of other entities based on the ordered table of the matching rules using an algorithm of structured query language (SQL).

18. The electronic procurement control system of claim 12, wherein the higher priority of the variables of the particular entity data is associated with a commodity, and wherein each of hierarchical attribute values associated with the commodity represents a transaction measure or a range of the transaction measure.

19. The electronic procurement control system of claim 18, further comprising:
  receiving the user input specifying a matching attribute of the commodity associated with the particular entity; and
  generating the current peer group of other entities based on a particular matching rule associated with the matching attribute of the commodity.

20. The electronic procurement control system of claim 19, further comprising:
  presenting the current peer group of other entities with the particular attribute associated with the particular entity in a drop-down menu on a graphical user interface of the electronic procurement control system; and
  arranging the current peer group of other entities for the particular entity with the result set of matching entities having the matching attribute in a decreased priority order.

* * * * *